US008630182B2

(12) United States Patent
Radke et al.

(10) Patent No.: US 8,630,182 B2
(45) Date of Patent: *Jan. 14, 2014

(54) PACKET DECONSTRUCTION/RECONSTRUCTION AND LINK-CONTROL

(75) Inventors: William H. Radke, Los Gatos, CA (US); Victor Y. Tsai, Palo Alto, CA (US); Peter Feeley, Boise, ID (US); Neal A. Galbo, Boca Raton, FL (US); Robert N. Leibowitz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,028

(22) Filed: Jul. 18, 2012

(65) Prior Publication Data

US 2012/0281537 A1 Nov. 8, 2012

Related U.S. Application Data

(63) Continuation of application No. 12/538,607, filed on Aug. 10, 2009, now Pat. No. 8,238,244.

(51) Int. Cl.
*H04L 12/56* (2006.01)

(52) U.S. Cl.
USPC .......................................... 370/235; 370/230

(58) Field of Classification Search
USPC ......... 370/310, 328, 338, 469, 229–231, 235, 370/389–390, 394, 474; 709/220
See application file for complete search history.

(56) References Cited

U.S. PATENT DOCUMENTS

| 7,076,569 | B1 | 7/2006 | Bailey et al. |
| 7,130,958 | B2 | 10/2006 | Chou et al. |
| 7,475,174 | B2 | 1/2009 | Chow et al. |
| 7,505,475 | B2 | 3/2009 | Suda |
| 7,698,428 | B2 | 4/2010 | Fatula |
| 2005/0135416 | A1 | 6/2005 | Ketchum et al. |
| 2005/0243743 | A1* | 11/2005 | Kimura ........................ 370/278 |

(Continued)

FOREIGN PATENT DOCUMENTS

| EP | 1411690 A1 | 4/2004 |
| EP | 1986698 A1 | 10/2008 |

(Continued)

OTHER PUBLICATIONS

Ajay V. Bhatt, Creating a PCI Express Interconnect, Technology and Research Labs, Intel Corporation, White Paper, http://www.pcisig.com/specifications/pciexpress/resources/PCI_Express_White_Paper.pdf, accessed Jul. 24, 2009. (8 pgs.).

(Continued)

*Primary Examiner* — Kwang B Yao
*Assistant Examiner* — Syed M Bokhari
(74) *Attorney, Agent, or Firm* — Brooks, Cameron & Huebsch, PLLC

(57) ABSTRACT

The present disclosure includes methods, devices, and systems for packet processing. One method embodiment for packet flow control includes deconstructing a transport layer packet into a number of link-control layer packets, wherein each of the link-control layer packets has an associated sequence number, communicating the number of link-control layer packets via a common physical connection for a plurality of peripheral devices, and limiting a number of outstanding link-control layer packets during the communication.

6 Claims, 3 Drawing Sheets

(56) References Cited

U.S. PATENT DOCUMENTS

| | | |
|---|---|---|
| 2006/0187955 A1 | 8/2006 | Rezaiifar et al. |
| 2007/0275728 A1 | 11/2007 | Lohr et al. |
| 2008/0016248 A1 | 1/2008 | Tsirtsis et al. |
| 2008/0186946 A1 | 8/2008 | Marinier et al. |
| 2008/0310452 A1* | 12/2008 | Vedantham et al. .......... 370/474 |
| 2009/0003335 A1 | 1/2009 | Biran et al. |
| 2009/0103511 A1 | 4/2009 | Marinier et al. |
| 2009/0129406 A1* | 5/2009 | Hwang .......................... 370/469 |
| 2009/0257418 A1* | 10/2009 | Allen et al. ................... 370/338 |
| 2009/0327830 A1 | 12/2009 | Lee et al. |
| 2010/0118781 A1* | 5/2010 | Petrovic et al. ............... 370/328 |
| 2010/0169466 A1* | 7/2010 | Atluri et al. ................... 709/220 |
| 2011/0032877 A1* | 2/2011 | Pani et al. ..................... 370/328 |
| 2011/0194470 A1* | 8/2011 | Dick et al. .................... 370/310 |

FOREIGN PATENT DOCUMENTS

| | | |
|---|---|---|
| JP | 2001-308947 | 11/2001 |
| JP | 2007-181127 | 7/2007 |
| TW | 1304536 | 12/2008 |
| WO | 2008/049462 A1 | 5/2008 |
| WO | 2008128597 | 10/2008 |

OTHER PUBLICATIONS

International Search Report and Written Opinion, 10 pages.
European Search Report and Opinion for related European Application No. 10808440.1, mailed Nov. 28, 2012, (7 pgs.).
Japanese Notice of Rejection from related Japanese application 2012-524691 dated May 28, 2013 (3pgs.)
Korean Notice of Preliminary Rejection from related Korean application 10-2012-7006228 dated Jun. 26, 2013 (3pgs.)
Korean Office Action for related Korean Application No. 10-2012-7006228, dated Oct. 31, 2013, 2 pages.
Taiwanese Office Action for related Taiwanese Application No. 099126680, dated Aug. 27, 2013, 4 pages.

* cited by examiner

PACKET DECONSTRUCTION/RECONSTRUCTION AND LINK-CONTROL

PRIORITY APPLICATION INFORMATION

This application is a Continuation of U.S. application Ser. No. 12/538,607, filed Aug. 10, 2009, the entire contents of which are incorporated herein by reference.

TECHNICAL FIELD

The present disclosure relates generally to packet processing in electronic devices, systems, and methods, and more particularly, to packet deconstruction/reconstruction and link-control.

BACKGROUND

Memory devices are typically provided as internal, semiconductor, integrated circuits and/or external removable devices in computers, personal digital assistants (PDAs), digital cameras, and cellular telephones, among various other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

A system can include a host, host system memory, and a number of peripheral devices such as memory devices. The host can have control circuitry including one or more of a number of processors, a host controller, host controller memory that is located on the host controller, and a number of internal memory devices. The host can communicate with peripheral devices to perform operations on the peripheral devices, such as receiving data from the devices to the host system or transferring data from the host system to the peripheral devices. The commands that control the receiving and/or transferring of data can be issued by the host system.

Data may be communicated, e.g., transferred and/or received, between a host and one or more peripheral devices using a flow of packets. Such packets may be generated by a transport layer protocol, e.g., a communication/transport layer protocol, which both the host and the one or more peripheral devices understand. Generation of such transport layer packets can be independent of the method of communication of the packets. Where the host and a particular peripheral device are directly connected, data flow packets generated by the transport layer protocol can be communicated between the host and the particular peripheral device directly. However, where more than one peripheral device is connected to the host via a common physical connection, a link-control layer may be utilized to provide flow control for concurrent data communication between the host and the peripheral devices.

DETAILED DESCRIPTION

Figure 1:
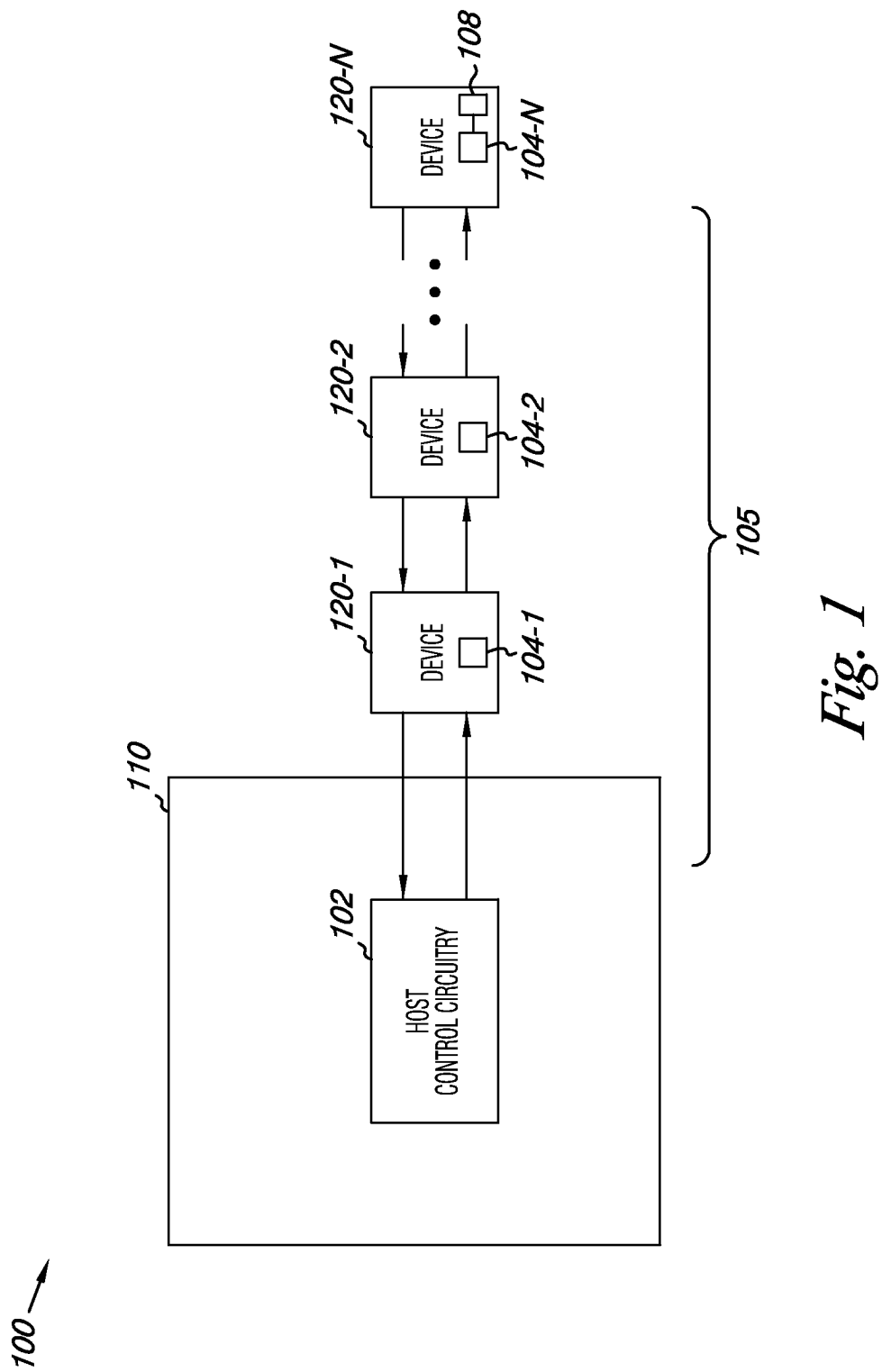
FIG. 1 illustrates a block diagram of a computing system in accordance with one or more embodiments of the present disclosure.

The present disclosure includes methods, devices, and systems for packet processing. One method embodiment for packet processing includes deconstructing a transport layer packet into a number of link-control layer packets, wherein each of the link-control layer packets has an associated sequence number, communicating the number of link-control layer packets via a common physical connection for a plurality of peripheral devices, and limiting a number of outstanding link-control layer packets during the communication.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a block diagram of a system 100 in accordance with one or more embodiments of the present disclosure. In FIG. 1, a host 110 is shown. In one or more embodiments, the host can be a computing device, such as a personal computer, among other computing device types. Examples of a host 110 include laptop computers, personal computers, mobile phone, digital cameras, digital recording and play back devices, PDA's, memory card readers, and interface hubs, among other examples.

The host 110 of FIG. 1 includes host control circuitry 102 among other host elements not shown. Host control circuitry 102 can include one or more of a processor, a host controller, and/or host memory. In one or more embodiments, the host control circuitry 102 can be used to communicate information between the number of peripheral devices 120-1, 120-2, ..., 120-N and another device, such as the host 110. One of ordinary skill in the art will appreciate that "a processor" can intend one or more processors, such as a parallel processing system, a number of coprocessors, etc.

The host 110 can include a transport layer, e.g., a communication/transport layer, a link-control layer, and/or a physical layer, which can be associated with host control circuitry. Host control circuitry 102 can be coupled to peripheral devices 120-1, 120-2, . . . , 120-N. In some embodiments, the host control circuitry 102 can manage transport, link, and physical layer activity without processor intervention and manage command retries without processor intervention. As one of ordinary skill in the art will appreciate, a transport layer can be analogous to a transaction layer as termed by various standards.

In one or more embodiments, the host control circuitry 102 can be coupled to a standardized interface. For example, the host control circuitry 102 can be coupled to an interface operated according to a universal flash storage (UFS) standard among other interfaces. In general, host control circuitry 102 can be coupled to an interface for communicating, e.g., passing, control, address, data and other signals between the peripheral devices 120-1, 120-2, . . . , 120-N, the host 110, and/or other devices.

In one or more embodiments, the peripheral devices 120-1, 120-2, . . . , 120-N can include peripheral device control circuitry 104-1, 104-2, . . . , 104-N that can be used to facilitate operations, such as read, write, and/or erase commands for memory devices, among other operations, that are communicated to the peripheral devices 120-1, 120-2, . . . , 120-N from the host 110. One or more of the peripheral devices can comprise and/or include an RF transceiver 108 coupled to the control circuitry, e.g., control circuitry 104-N. Although only peripheral device 120-N is illustrated in FIG. 1 with an RF transceiver 108, embodiments are not so limited as a number of peripheral devices can include such a transceiver. The RF transceiver 108 can transmit and/or receive data to and/or from a wireless device (not illustrated). For example, the RF transceiver 108 can receive a transport layer packet from a wireless device.

The peripheral devices 120-1, 120-2, . . . , 120-N can share a common physical connection 105 to the host 110. The common physical connection 105 can include the upstream and/or downstream connection between the host 110 and the peripheral devices 120-1, 120-2, . . . , 120-N. For example, the peripheral devices 120-1, 120-2, . . . , 120-N can be coupled to the host 110 in a chained topology, e.g., chained together. In some embodiments, one or more peripheral devices, e.g., peripheral device 120-N, can be removed from the chain. In one or more embodiments, the peripheral device control circuitry 104-1, 104-2, . . . , 104-N can provide a translation layer between the host 110 and the peripheral devices 120-1, 120-2, . . . , 120-N. Thus, peripheral device control circuitry could selectively couple an I/O connector (not shown in FIG. 1) of a peripheral device to receive the appropriate signal at the appropriate I/O connection at the appropriate time. Similarly, the communication protocol between a host 110 and the peripheral devices 120-1, 120-2, . . . , 120-N may be different than what is required for access to the peripheral devices 120-1, 120-2, . . . , 120-N. The peripheral device control circuitry 104-1, 104-2, . . . , 104-N could then translate the command sequence received from a host 110 into appropriate command sequences to achieve the desired access to peripheral devices 120-1, 120-2, . . . , 120-N. Each translation may further include changes in signal voltage levels in addition to command sequences.

As used herein, in one or more embodiments, chained peripheral devices (e.g., 120-1, 120-2, . . . , 120-N) can refer to peripheral devices communicatively coupled to a host (e.g., host 110) via a common physical connection, such as a shared interface port of a host (e.g., via the same interface port of host control circuitry 102). A particular host interface port can include a data input port and a data output port. As such, data can be communicated between the host 110 and the chained peripheral devices 120-1, 120-2, . . . , 120-N via the same single interface port of the host 110. The use of particular ports on a host or peripheral devices is described in more detail with respect to FIG. 2.

The embodiments of FIG. 1 can include additional circuitry that is not illustrated so as not to obscure embodiments of the present disclosure. For example, in one or more embodiments in which the peripheral devices 120-1, 120-2, . . . , 120-N are memory devices, the memory devices can include address circuitry to latch address signals provided over I/O connectors through 110 circuitry. Address signals can be received and decoded by a row decoder and a column decoder, to access the memory devices. It will be appreciated by those skilled in the art that the number of address input connectors depends on the density and architecture of the memory devices. Furthermore, in one or more embodiments a host and/or peripheral device can include one or more cache lines, e.g., for arranging incoming data prior to processing and/or storing the data, among other operations.

Figure 2:
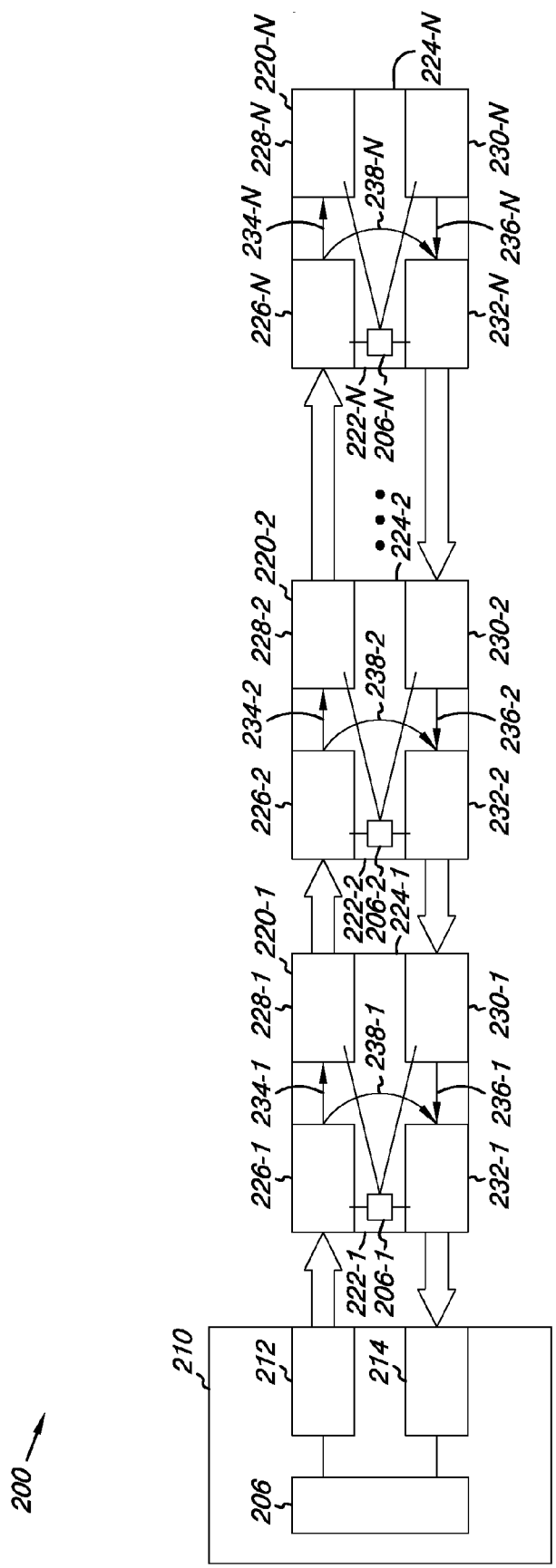
FIG. 2 illustrates a block diagram of a computing system in accordance with one or more embodiments of the present disclosure.

FIG. 2 illustrates a block diagram of a system 200 in accordance with one or more embodiments of the present disclosure. The system 200 includes a chain of peripheral devices, e.g., memory devices, according to one or more embodiments of the present disclosure. Although memory devices are used as an example, other types of peripheral devices or combinations of peripheral devices are also within the scope of embodiments of the present disclosure. Examples of other peripheral devices include, but are not limited to, printers, scanners, cameras, wireless communication peripherals such as Bluetooth or WiFi devices, external hard drives, solid state drives, flash drives, etc. Examples of memory devices include flash memory, DRAM, SRAM, one or more NAND devices or a Managed NAND implementation, e.g., a NAND controller and one or more NAND devices, or other peripheral devices for data storage.

In FIG. 2, a host 210 is shown having a data output port 212, a data input port 214, and a buffer 206. Host 210 can be analogous to host 110 illustrated in FIG. 1 and can include control circuitry such as control circuitry 102 illustrated in FIG. 1. Coupling peripheral devices to a single data output port 212 and a single data input port 214 can reduce a number of pins that may otherwise be included on a host 210. Such embodiments can help decrease device cost and help simplify production. In one or more embodiments, single data ports such as the single data output port 212 or the single data input port 214 may each include multiple data lanes. The term single data port is used to illustrate a single serial connection to a host for multiple peripheral devices, in contrast to a parallel connection for each peripheral device on a host.

As described herein, the host 210 can be configured to deconstruct a transport layer packet into a number of link-control layer packets and communicate the number of link-control layer packets via the data output port 212. The host can monitor a number of acknowledgements, corresponding to the number of link-control layer packets, received via the data input port 214. The number of acknowledgements can be used by the host to limit the number of link-control layer packets communicated via the data output port 214 as described herein. The host 210 can reconstruct a transport layer packet from a number of link-control layer packets received via the data input port 214.

A first peripheral device 220-1 is shown with a second peripheral device 220-2 and an Nth peripheral device 220-N coupled in a chain configuration. A chained peripheral device configuration as shown in FIG. 2 can allow for point to point signaling. Using the configuration shown, a chain of peripheral devices can be arbitrarily long without the use of complex addressing circuitry as explained herein. The peripheral devices 220-1, 220-2, . . . , 220-N illustrated in FIG. 2 can be analogous to the peripheral devices 120-1, 120-2, . . . , 120-N illustrated in FIG. 1 and can include control circuitry such as control circuitry 104-1, 104-2, . . . , 104-N illustrated in FIG. 1. Each peripheral device 220-1, 220-2, . . . , 220-N can be associated with one or more device identifications (DID) and/or logical unit numbers (LUN). For example, a particular peripheral device could have one DID and two or more LUN.

The peripheral devices 220-1, 220-2, . . . , 220-N are shown with an upstream side 222-1, 222-2, . . . , 222-N and a downstream side 224-1, 224-2, . . . , 224-N. The peripheral devices can include an upstream data input port 226-1, 226-2, . . . , 226-N, a downstream data output port 228-1, 228-2, . . . , 228-N, a downstream data input port 230-1, 230-2, . . . , 230-N, and an upstream data output port 232-1, 232-2, . . . , 232-N. Each data port for a particular peripheral device can be coupled to control circuitry for the particular peripheral device. In operation, data or device commands such as address assignments, requests for data, etc. can pass through a given device such as from the upstream data input port to the downstream data output port along arrow 234-1, 234-2, . . . , 234-N. Data/commands can pass internally within a given peripheral device such as along arrow 238-1, 238-2, . . . , 238-N from the upstream data input port 226-1, 226-2, . . . , 226-N to the upstream data output port 232-1, 232-2, . . . , 232-N. Data/commands can pass directly through a give peripheral device on a return path from the downstream data input port 230-1, 230-2, . . . , 230-N to the upstream data output port 232-1, 232-2, . . . , 232-N as shown by arrow 236-1, 236-2, . . . , 236-N. The peripheral devices 220-1, 220-2, . . . , 220-N can include a buffer 206-1, 206-2, . . . , 206-N coupled to control circuitry of the respective peripheral device. The buffer for each respective peripheral device can be coupled to one or more of the upstream and downstream data input and output ports. Although three peripheral devices are shown in the system 200, the present disclosure is not so limited. Using the configuration shown, a greater or lesser number of peripheral devices can be included.

As described herein, a peripheral device 220-1, 220-2, . . . , 220-N can be configured to deconstruct a transport layer packet into a number of link-control layer packets and communicate, e.g., transfer, the number of link-control layer packets via one or more of the upstream data output port 232-1, 232-2, . . . , 232-N and the downstream data output port 228-1, 228-2, . . . , 228-N. A peripheral device 220-1, 220-2, . . . , 220-N can communicate an interrupt link-control layer packet via the upstream data output port 232-1, 232-2, . . . , 232-N, e.g., to the host 210. A peripheral device can pass-through a number of link-control layer packets from an input port to an output port either upstream or downstream as described herein. A peripheral device 220-1, 220-2, . . . , 220-N, can reconstruct a transport layer packet from a number of link-control layer packets received via one or more of the upstream data input port 226-1, 226-2, . . . , 226-N and the downstream data input port 230-1, 230-2, . . . , 230-N.

Control circuitry for a particular peripheral device, e.g., peripheral device 220-N, can be configured to reconstruct a transport layer packet from a number of link-control layer packets received via a particular data input port when the link-control layer packets are associated with a destination address, e.g., a DID or LUN, for the peripheral device 220-N. When the received link-control layer packets are associated with a destination address for a different peripheral device, e.g., an address associated with peripheral device 220-2, the receiving peripheral device 220-N can pass-through the number of link-control layer packets in an upstream or downstream direction, e.g., through the appropriate output port, toward the destination address associated with the number of link-control layer packets. In one or more embodiments, the link-control layer may not be used to route packets.

The host 210 can be configured to maintain packet flow control on the common physical connection, e.g., common physical connection 105 in FIG. 1, between the host 210 and the plurality of peripheral devices 220-1, 220-2, . . . , 220-N. As such, a peripheral 220-1, 220-2, . . . , 220-N device can be configured to communicate an interrupt link-control layer packet to a host 210, e.g., in an upstream direction to the host 210. The interrupt link-control layer packet can serve to notify the host 210 that the peripheral device 220-1, 220-2, . . . , 220-N is ready to communicate data via the common physical connection. For example, the interrupt link-control layer packet can indicate that the peripheral device 220-1, 220-2, . . . , 220-N has received data, e.g., one or more transport layer packets, via an RF transceiver 108. The interrupt link-control layer packet can include a context of the data to be communicated via the common physical connection.

In one or more embodiments, a peripheral device 220-1, 220-2, . . . , 220-N can be configured to communicate an interrupt link-control layer packet to the host 210 after a period of delay from an instruction previously received from the host 210. The interrupt link-control layer packet can include an indication of the instruction. The peripheral device 220-1, 220-2, . . . , 220-N can be configured to communicate the interrupt link-control layer packet when data associated with the instruction is ready to be communicated via the common physical connection.

Embodiments shown in FIGS. 1-2 may include hard wired devices or they may include sockets for assembly or expanding capabilities. One or more embodiments may include a number of expansion sockets, where there are still available sockets downstream of the last peripheral device in the chain. In such a configuration, the last peripheral device, e.g., peripheral device 220-N, can be removed and additional peripheral devices can be placed in the chain, then the last peripheral device can be reinserted at the end of the newly lengthened chain. In some embodiments additional peripheral devices can be added to the end of the chain for expansion purposes without removing and reinstalling a dedicated last peripheral device in the chain.

Figure 3A:
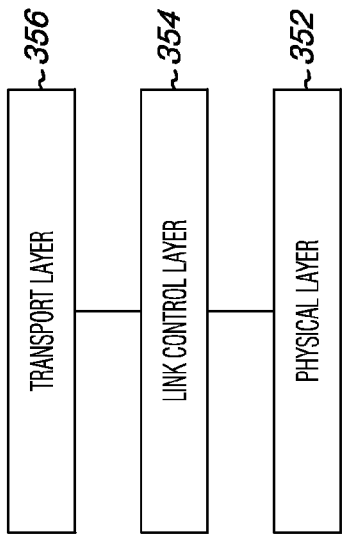
FIG. 3A illustrates a block diagram of a layered architecture for an interface in accordance with one or more embodiments of the present disclosure.

FIG. 3A illustrates a block diagram of a layered architecture for an interface in accordance with one or more embodiments of the present disclosure. For example, such a layered architecture can be implemented in a host control circuitry, e.g., host control circuitry 102 in FIG. 1, and/or device control circuitry, e.g., device control circuitry 104-1, 104-2, . . . 104-N according to one or more embodiments of the present disclosure.

The layered architecture can include a transport layer 356, a link-control layer 354, and a physical layer 352, among other layers. Data flow packets between a host and one or more devices may be generated by the transport layer, e.g., using a protocol that both the host and devices understand. Such a protocol can be independent of the method of transmission of the data flow of packets, e.g., wired, wireless, etc. When a device is attached directly to a host, data flow packets generated by the transport layer 356 can be communicated between the host and device directly.

When one or more devices are attached to the host via a common physical connection, a link-control layer 354 may be put in place to improve utilization of the data flow connection between the host and devices and/or to provide flow control for concurrent data communication between the host and multiple devices. The link-control layer 354 can be implemented to monitor and/or modulate data communication between a host and one or more devices. As described herein, the link-control layer 354 can exert finer control of packet size and flow control by deconstructing and reconstructing the data flow packets generated by the transport layer 356 between the host and devices.

Figure 3B:
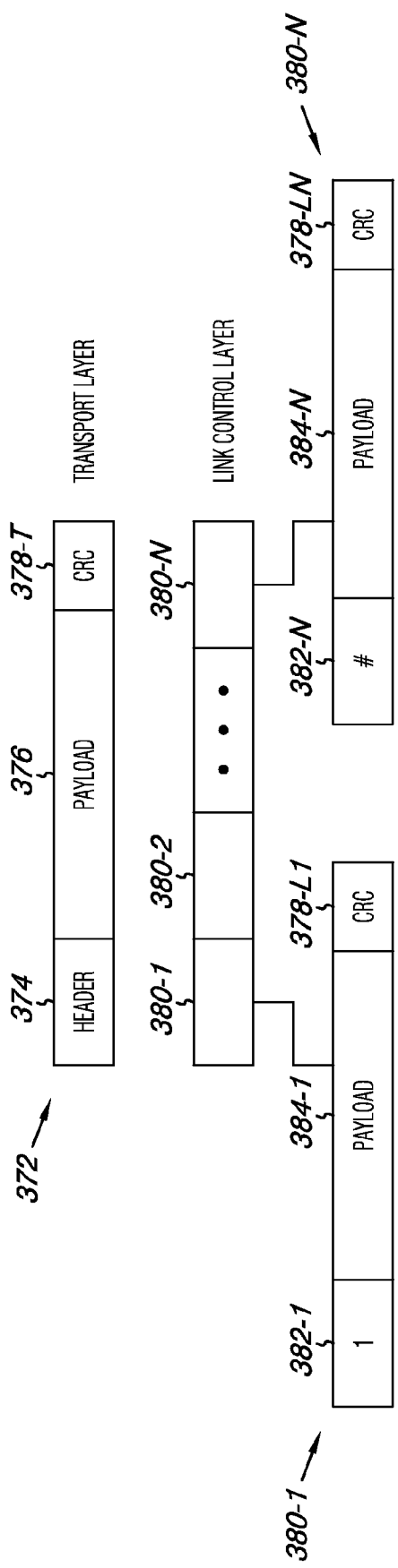
FIG. 3B illustrates a block diagram of a number of packets in a layered architecture in accordance with one or more embodiments of the present disclosure.

FIG. 3B illustrates a block diagram of a number of packets in a layered architecture in accordance with one or more embodiments of the present disclosure. In one or more embodiments, a data flow from a host to a target device, or from a device to a host, can be deconstructed into link-control layer packets and reconstructed into the original data flow, e.g., transport layer packets.

As illustrated in FIG. 3B, a transport layer packet 372 can include one or more of a header 374, a payload 376, and an error detection component 378-T, such as a cyclic redundancy check (CRC) value, a checksum, or an error correction code (ECC) parity value. In one or more embodiments, the error detection component 378-T can be part of the payload 376. The header 374 may contain the context, e.g., the destination address of the transport layer packet 372. For example, the header 374 may contain information relating to a command type, a target device ID (DID), a logical unit number (LUN), status, and/or other attributes. The payload 376 of the transport layer packet 372 can include data and/or commands.

The transport layer packet 372 can be deconstructed into a number of link-control layer packets, e.g., link-control layer packets 380-1, 380-2, . . . , 380-N. The transport layer packet 372 can be deconstructed according to a priority and/or an order associated with the transport layer packet 372, e.g., with respect to a number of other transport layer packets. In some embodiments, the transport layer packet 372 can be deconstructed into a number of link-control layer packets 380-1, 380-2, . . . , 380-N before communication through a common physical connection, e.g., from a host to a peripheral device, from a peripheral device to a host, or from a first peripheral device to a second peripheral device. In one or more embodiments, an entire transport layer packet 372 can be loaded to a buffer, e.g., a host buffer 106 or peripheral device buffer 106-1, 106-2, . . . , 106-N as illustrated in FIG. 1, before the transport layer packet is deconstructed into link-control layer packets 380-1, 380-2, . . . , 380-N, as described herein. Alternatively, the transport layer packet can be deconstructed as it enters the link-control layer 354 from the transport layer 356.

Each link-control layer packet, e.g., link-control layer packet 380-1, can be smaller, e.g., can include fewer bits, than the transport layer packet, e.g., transport layer packet 372, from which the link-control layer packet was deconstructed. Deconstructing a transport layer packet according to one or more embodiments of the present disclosure can provide, for example, more efficient communication of data through a common physical connection.

In one or more embodiments, a link-control layer packet, e.g., each link-control layer packet, can have a sequence number, e.g., sequence number "1" 382-1 in link-control layer packet 380-1, appended thereto. In some embodiments, each link-control layer packet that is deconstructed from a transport layer packet can have a sequence number inserted in an order corresponding to the sequential portion of the transport layer packet that the link-control layer packet represents, e.g., from 1 to N. As illustrated in FIG. 3B, the last link-control layer packet 380-N can include sequence number "N" 382-N. Sequence numbers can help maintain link-control layer packet order and aid in reconstruction of the original transport layer packet.

Sequence numbers can be appended to link-control layer packets in an x-bit field of a header of the link-control layer packets, e.g. a field capable of storing x number of bits. As the total number of sequence numbers available may be limited by a constraint on the size of the field to which the sequence numbers are appended, sequence numbers may be recycled. That is, after $2^x$ sequence numbers have been used, e.g., after $2^x$ link-control layer packets have had sequence numbers assigned for a particular data flow, sequence numbers may be recycled, e.g., reused. For example, if the sequence numbers are limited to the set including 1, 2, 3, and 4, after all four sequence numbers have been used once, they may be used again, e.g., both a first and a fifth link-control layer packet may have the sequence number 1 assigned thereto. Link-control layer packets can be communicated out of sequence with respect to the sequence numbers appended thereto.

One or more embodiments can include limiting the number of outstanding link-control layer packets that are communicated via a common physical connection for a number of peripheral devices. Limiting the number of outstanding link-control layer packets can include limiting the number of outstanding packets to less than or equal to $$\frac{2^x}{2}$$

link-control layer packets. That is, for example, control circuitry, e.g., host control circuitry 102 in FIG. 1, can confirm that at least half of the total number of sequence numbers worth of link-control layer packets have been acknowledged before communicating an additional link-control layer packet. For example, if 16 sequence numbers are available, the control circuitry can be configured to limit the outstanding number of link-control layer packets to 8.

An outstanding packet can include packets that have not been acknowledged and/or packets that have received an acknowledgement such as a retransfer request, e.g., a negative acknowledgement. Accordingly, in one or more embodiments, limiting the number of outstanding link-control layer packets can include using a bit of the x-bit field as a retransfer request bit. A particular link-control layer packet can be recommunicated when the sending device does not receive an acknowledgement for the particular link-control layer packet, or when the sending device receives a negative acknowledgement. Such embodiments can help to prevent packet errors due to a particular sequence number being recycled before a particular link-control layer packet associated with the particular sequence number has been received successfully.

According to one or more embodiments of the present disclosure, the link-control layer can treat all data in the transport layer packet 372, e.g., the header 374, the payload 376, and the error detection component 378-T, as data payload. That is, the entirety of the transport layer packet 372 can be broken up into smaller portions that fit into link-control layer packets 380-1, 380-2, . . . , 380-N, irrespective of a distinction between the header 374 and the payload 376. For example, link-control layer packet 380-1 may include a portion of the header 374 of the transport layer packet 372, it may include the entire header 374, or it may include at least a portion of the header 374 and a portion of the payload 376.

Although a transport layer packet may be deconstructed into a number of link-control layer packets, each link-control layer packet can maintain and/or express the direction and/or end of the data transmission, e.g., upstream or downstream, the data destination, e.g., the target such as a DID or LUN, and the packet sequence number, e.g., packet sequence number 380-1. That is, each link-control layer packet can have the same direction and/or end of data transmission in the link-control layer that the transport layer packet would have had in the transport layer. For example, the direction and/or end of the data transmission can be maintained and/or expressed in a header of a link-control layer packet as assigned by control circuitry of the device transferring the data.

One or more embodiments can include deconstructing a transport layer packet 372 into a number of link-control layer packets 380-1, 380-2, . . . , 380-N such that the number of link-control layer packets 380-1, 380-2, . . . , 380-N have a payload 384-1, . . . , 384-N size equivalent to a cache line size of a receiving device. Such embodiments can provide for efficient reception of data and reconstruction of transport layer packets 372. That is, a cache line of the receiving device can be filled and emptied with each received link-control layer packet payload 384-1, . . . , 384-N, thereby helping to prevent inefficiencies associated with partially loading the cache line or splitting individual packets across multiple loads of the cache line. Example sizes for a cache line according to the present disclosure can include 32 bytes or 64 bytes, however embodiments are not so limited. After reconstruction, the receiving device, in some instances, can store the transport layer packet 372 payload 376 as a sector of data. An example size for a sector of data can be 512 bytes, however embodiments are not so limited.

Each link-control layer packet 380-1, 380-2, . . . , 380-N may include its own error detection component 378-L1, . . . , 378-LN. An error detection component, e.g., CRC 378-L1, for a link-control layer packet, e.g., packet 380-1, can be generated for the link-control layer packet independent of the error detection component, e.g., CRC 378-T, associated with the transport layer packet 372 from which the link-control layer packet was deconstructed. As illustrated in FIG. 3B, for link-control layer packet 380-1, the sequence number 382-1 and the error detection component 378-L1 are generated by the link-control layer, while the payload 384-1 includes data from the original transport layer packet 372. The sequence number 382-1 and error detection component 378-L1 for a particular link-control layer packet 380-1 can be used by the link-control for recommunication, flow control, and the like. As described herein, the payload 384-1 of a particular link-control layer packet 380-1 may include data from one or more of the header 374, payload 376, and/or error detection component 378-T of the corresponding transport layer packet 372.

A transport layer packet 372 can be reconstructed from a number of link-control layer packets 380-1, 380-2, . . . , 380-N, e.g., according to a sequence number associated with each of the link-control layer packets 380-1, 380-2, . . . , 380-N. The device receiving the number of link-control layer packets 380-1, 380-2, . . . , 380-N can be configured to acknowledge each of the number of link-control layer packets. Alternatively, the device receiving the number of link-control layer packets 380-1, 380-2, . . . , 380-N can be configured to acknowledge the transport layer packet 372 once it has been reconstructed.

In one or more embodiments, a device or host can load received link-control layer packets into a buffer in sequential order according to the sequence number associated with each packet, e.g., sequence number 382-1 associated with link-control layer packet 380-1. Once the entire transport layer packet is reconstructed, the data can be communicated to its destination according to address information associated with the reconstructed packet, e.g., as stored in the header 374 of the reconstructed packet.

In one or more embodiments, the payload 384-1 of the first link-control layer packet 380-1 deconstructed from a transport layer packet 372 can store the header 374 of the transport layer packet 372. The header 374 can include a context that describes destination information for the transport layer packet 372. The context, e.g., the destination information, can be derived from the header of the transport layer packet 372 received in association with the initial link-control layer packet 380-1. The context can be loaded into a buffer of the receiving device before transferring the link-control layer packets, e.g., the initial link-control layer packet 380-1 and/or the subsequent link-control layer packets 380-2, . . . , 380-N.

The link-control layer of a device receiving the first link-control layer packet 380-1 deconstructed from the transport layer packet 372 can transfer the first link-control layer packet 380-1 to its destination. Subsequent link-control layer packets 380-2, . . . , 380-N can be transferred without reconstructing the transport layer packet 372. In such embodiments, subsequent link-control layer packets 380-2, . . . , 380-N can be transferred to their destination in the order in which they are received by the receiving device. The subsequent link-control layer packets 380-2, . . . , 380-N can be transferred according to the context in the buffer. In some instances, transferring subsequent link-control layer packets 380-2, . . . , 380-N in the order in which they are received can include transferring subsequent link-control layer packets 380-2, . . . , 380-N out of sequence with respect to a sequence number associated with each link-control layer packet, e.g., sequence number 382-N associated with link-control layer packet 380-N. The destination device, e.g., the device to which the receiving device transfers the link-control layer packets 380-1, 380-2, . . . , 380-N, can reconstruct the transport layer packet 372.

According to one or more embodiments, the receiving device can reconstruct and transfer the transport layer packet 372 to a destination described in a context of the transport layer packet 372, e.g., to the destination device. For example, a host can generally be a receiving device for a transport layer packet 372 reconstructed from a number of link-control layer packets 380-1, 380-2, . . . , 380-N received from a peripheral device, however, the transport layer packet 372 can have a more specific destination described in a context associated therewith, e.g., in a transport layer packet header 374. The more specific destination address can be a memory address associated with the host, among other specific destination addresses. Likewise a peripheral device, e.g., peripheral device 220-2 in FIG. 2, can be a receiving device that can transfer a reconstructed transport layer packet 372 to a destination described in a context of the transport layer packet 372, where the destination is another peripheral device, e.g., peripheral device 220-1 illustrated in FIG. 2. In some instances, the receiving device can be the destination device.

CONCLUSION

The present disclosure includes methods, devices, and systems for packet processing. One method embodiment for packet processing includes deconstructing a transport layer packet into a number of link-control layer packets, wherein each of the link-control layer packets has an associated sequence number, communicating the number of link-control layer packets via a common physical connection for a plurality of peripheral devices, and limiting a number of outstanding link-control layer packets during the communication.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

As used herein, the term "and/or" includes any and all combinations of one or more of the associated listed items. As used herein the term "or," unless otherwise noted, means logically inclusive or. That is, "A or B" can include (only A), (only B), or (both A and B). In other words, "A or B" can mean "A and/or B" or "one or more of A and B."

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for processing packets, comprising:
    deconstructing a transport layer packet into a number of link-control layer packets, wherein each of the link-control layer packets has an associated sequence number;
    appending the associated sequence number in an x-bit field of a header of each of the number of link-control layer packets, wherein x comprises a number of bits in the x-bit field;
    communicating the number of link-control layer packets via a common physical connection for a plurality of peripheral memory devices; and
    limiting a number of outstanding communicated and negatively acknowledged and/or not acknowledged link-control layer packets to less than or equal to $$\frac{2^x}{2}$$

link-control layer packets during the communication.

2. The method of claim 1, wherein the method includes recommunicating a particular link-control layer packet when an original transfer of the particular link-control layer packet is negatively acknowledged or is not acknowledged.

3. The method of claim 1, wherein the method includes loading the transport layer packet into a buffer before deconstructing the transport layer packet into the number of link-control layer packets.

4. The method of claim 1, wherein the method includes deconstructing the transport layer packet into the number of link-control layer packets as the transport layer packet enters the link-control layer.

5. The method of claim 1, wherein the method includes communicating the number of link-control layer packets out of sequence with respect to the respective sequence number associated with each link-control layer packet.

6. The method of claim 1, wherein the transport layer packet includes a header and a payload; and
    wherein deconstructing the transport layer packet includes deconstructing the header and the payload into link-control layer packets irrespective of a distinction between the header and the payload.

* * * * *